Feb. 15, 1966  D. P. WELLES, JR  3,234,986
MEANS FOR THREADEDLY JOINING TWO MEMBERS
Filed Oct. 24, 1963  2 Sheets-Sheet 1
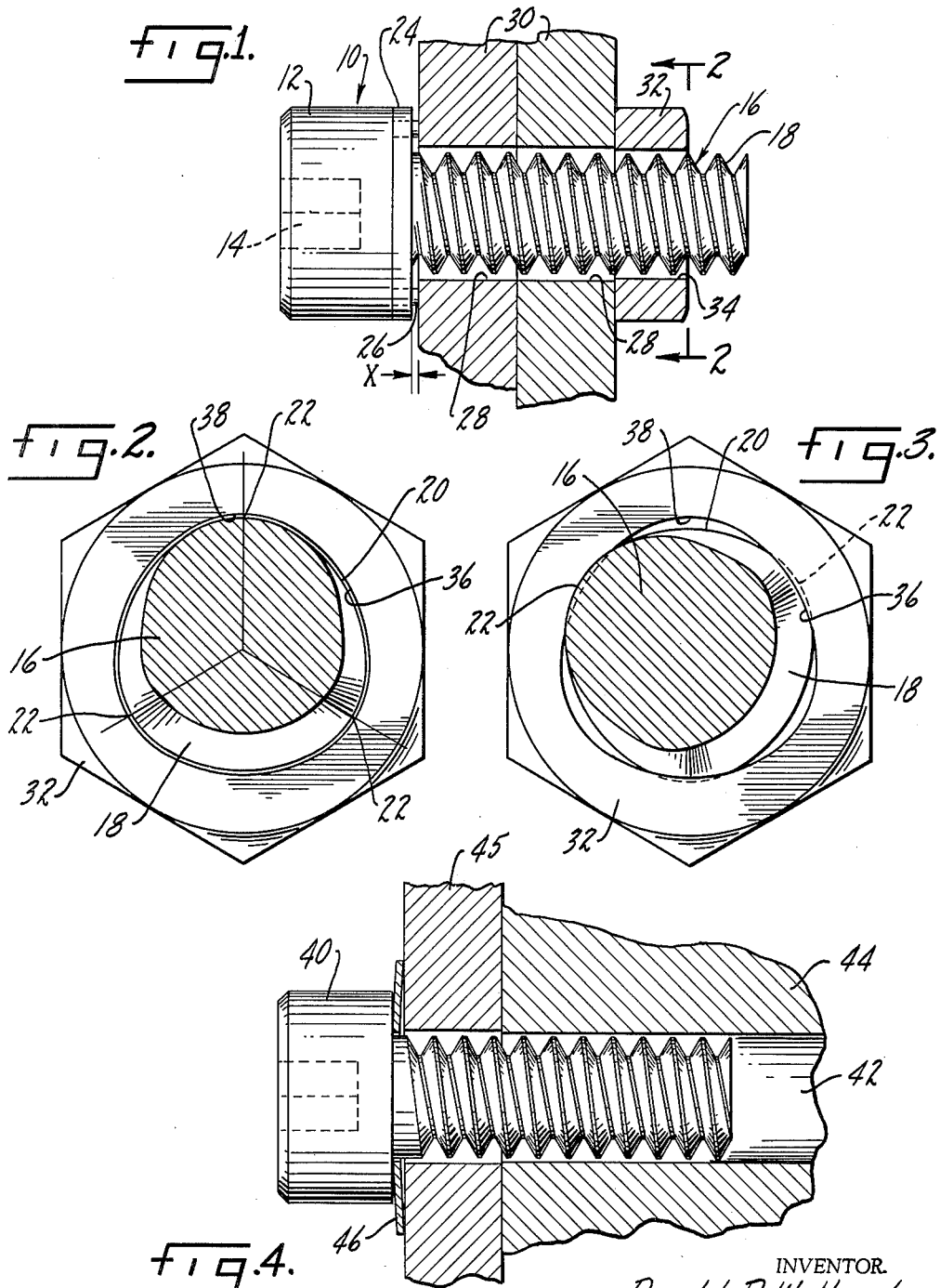

Feb. 15, 1966     D. P. WELLES, JR     3,234,986
MEANS FOR THREADEDLY JOINING TWO MEMBERS
Filed Oct. 24, 1963     2 Sheets-Sheet 2
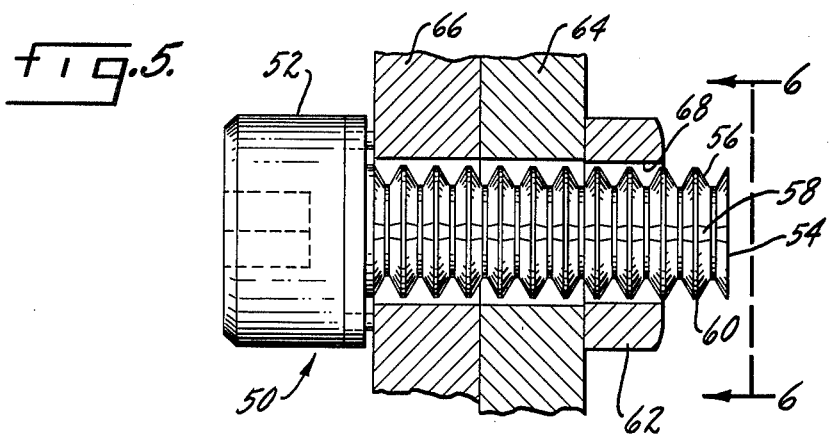
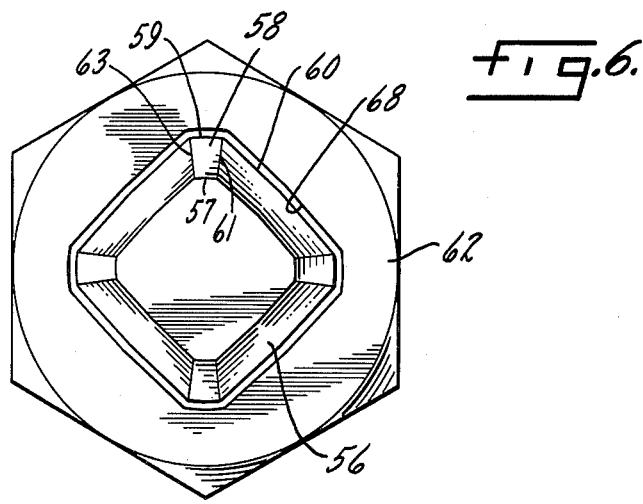
INVENTOR.
Donald P. Welles, Jr.
BY Parker & Carter
Attorneys.

3,234,986
**MEANS FOR THREADEDLY JOINING
TWO MEMBERS**
Donald P. Welles, Jr., Rockford, Ill., assignor to Besly-Welles Corporation, South Beloit, Ill., a corporation of Illinois
Filed Oct. 24, 1963, Ser. No. 318,655
2 Claims. (Cl. 151—19)

This invention relates to a means and method for threadedly joining two members.

A primary purpose is a means and method of the type described which eliminates the conventional tapping of the nut or hole which is to receive a bolt or cap screw.

Another purpose is a method of the type described including the step of limiting the amount of relative rotation between the two members to that necessary for maximum locking.

Another purpose is a combination threaded stud and smooth bored opening which is satisfactory for quickly locking two members in threaded engagement.

Another purpose is a means for quickly, effectively and inexpensively threadedly locking or joining two members together.

Another purpose is a method of threadedly joining two members together which eliminates extensive manual turning.

Other purposes will appear in the ensuing specification, drawings and claims.

The invention is illustrated diagrammatically in the following drawings wherein:

FIGURE 1 is an axial section illustrating a cap screw and nut, joined together on opposite sides of a pair of plates or the like, FIGURE 2 is a section along plane 2—2 of FIGURE 1, FIGURE 3 is a section along plane 2—2 of FIGURE 1 in locked position, FIGURE 4 is an axial section showing a modified cap screw arrangement attached to a plate or the like, FIGURE 5 is an axial section, similar to FIGURE 1, illustrating a modified form of the invention, and FIGURE 6 is a view along plane 6—6 of FIGURE 5.

In FIGURE 1, a cap screw 10 may have a conventional head 12 and a tool receiving opening 14. The cap screw 10 may have a thread-like configuration or threaded shank 16 which can be described as generally cylindrical, although as shown in FIGURES 2 and 3, it is generally lobular in cross section.

The shank 16 has a thread 18 which is preferably generally continuous, although it could be interrupted, and which includes a plurality of radial reliefs 20, with each 360 degrees of thread having a plurality of radial high points or raised areas 22, with the radial reliefs 20 being between the radial high points.

Preferably the thread on the shank 16 has a full thread depth throughout. The pitch, crest and root diameters of the thread, beginning at one side of a radial relief 20, gradually increase and gradually merge into the pitch, crest and root diameters of the working areas or thread forming areas 22. The pitch, crest and root diameters of the working sections 22 gradually fall off and merge into the pitch, crest and root diameters of the radial reliefs 20. The number of working areas 22 or the number of sides of the lobular-shaped cross section will vary, providing that there are at least three working sections in each 360 degrees of thread. It is also preferred that the working areas 22 be axially aligned with each other. The shank 16 may be generally cylindrical in configuration, although in some applications it may be desirable to chamfer or bevel the end of the shank for easy entry into the hole. A thread of this same general type is described in detail in my patent, Re. 24,572.

In one form of the invention a small ring or the like 24 may be attached to the head 12 adjacent the shank. Positioned within the ring 24 are a plurality of projections 26 which preferably are formed of a compressible material. In the alternative, the projections 26 may be annular or formed on an arc, as what is important is to have some type of compressible extension which extends outwardly beyond the ring 24 a distance X. The distance X is equal to one over two times the number of working areas 22 in any 360 degrees of thread times the pitch, or the distance between the crest of two adjacent threads. For example, if there are three lobes or working sections 22, then the distance X would be equal to one-sixth of a pitch. This distance is important. The type of compressible material may vary. Rubber, a suitable rubber substitute, nylon or any other material which may be compressed is satisfactory.

In one use of the invention the cap screw 10 will be inserted through aligned holes 28 in a pair of plates 30 which are to be joined together. A nut or the like 32 having an opening 34 which has generally the same cross sectional shape as the shank 16 is placed over the shank. It is important that the cross section of the opening or hole 34 be generally the same as that of the shank 16, and the nut and shank must be aligned when the nut is placed on the shank. The opening or hole 34 is lobular in shape and has areas 36 of small radius and areas 38 of a greater radius. The areas 36 and 38 are the counterpart of the radial reliefs 20 and the working sections 22.

Relative rotation between the nut and shank, as well as axial movement between these members, will cause the working areas 22 to move into the material of the nut and to form a thread on the interior smooth surface of the hole 34. The radial distance to the areas 20 on the shank should be generally less than the pitch radius of the working areas 22. Relative rotation between the nut and shank will continue until the working areas 22 are aligned or positioned at the areas 36 on the nut or until there is maximum radial pressure applied from the working areas 22 into the material of the nut. This position is indicated in FIGURE 3. Note the overlap in dotted lines. As the threads on the shank 16 move into the nut they will displace or swage the metal and will cause the metal to flow inwardly around the threads on the shank until, generally speaking, full depth threads are formed in limited areas on the nut. The fullness of the thread formed on the nut will fall off from full thread depth formed at the areas of maximum radial penetration to sections of no thread formation at areas 38.

The compressible material 26 limits axial and rotary movement between the shank 16 and the nut. By having this material extend a predetermined distance outside of the ring 24, with this distance equal to one over two times the number of working areas 22 in a single turn of the thread, the maximum distance that the nut can turn on the shank 16 will properly position the working areas 22 opposite the relieved areas 36 on the nut. Because the thread is helical, rotation will axially move the nut relative to the shank 16 and this will compress the material 26 inside the ring 24. Once the ring has firmly contacted one of the plates 30, there can be no further rotation between the shank 16 and the nut, and the two are firmly locked together.

FIGURE 4 illustrates an alternative form of the invention. In this case it is desirable to thread a cap screw or the like 40 into a bore 42 in a member 44 to attach a plate or the like 45. A washer 46 may be placed between the head of the cap screw and the outside surface of the member 45. The washer will have a bow or a curvature, in the uncompressed condition, equal to the distance X as described above. Turning of the screw 40 will cause the same swaging action of the metal within the bore 42.

The screw 40 may be advanced the distance X at which time the washer 46 will be flatly compressed against the outside surface of the member 45. After the screw has been advanced and turned through this distance, there will be full locking contact between the threads on the shank of the screw and the material forming the hole or bore 42.

FIGURES 5 and 6 show a modified form of the invention in which a member 50 may include a conventional head 52 and a shank 54. The shank 54 may be generally cylindrical in form, as that term is used herein, although it will be lobular in cross section as illustrated in FIGURE 6. The thread-like configuration may be formed on the shank 54, with the thread-like configuration being made up of a series of preferably generally equally spaced concentric rings 56, each having a generally thread-like cross section. The concentric rings 56 may be generally perpendicular to the axis of the shank 54 or they may be slightly tilted or canted to the axis.

As shown particularly in FIGURE 6, each of the concentric rings 56 may include a radial area or locking area 58, which may be described as somewhat trapezoidal in form with relieved areas 60 connecting each of the radial locking areas 58. Each of the areas 58 may be defined by inner and outer concentric circles 57 and 59 joined by leading and trailing flanks 61 and 63. The transition from the relieved areas 60 to the radial areas 58 is preferably gradual, although the invention should not be so limited. The number of radial and relieved areas may vary, and there may be three, four or more. A configuration somewhat like that disclosed herein may be found in my earlier Patent 2,991,491. The relationship between the maximum radius in the radial areas and the radius of the relieved areas is important. It is preferred that the minimum radius of the relieved areas 60 be less than the maximum pitch radius of the radial areas 58. In this connection, it should be understood that it is preferred that the thread be of generally full depth throughout each 360 degrees of each concentric ring. Essentially, the difference between the form shown in FIGURES 5 and 6 and the form shown in FIGURES 1–4 is that the thread-like configuration is in concentric rings rather than a continuous thread.

A nut 62 may be used in conjunction with the member 50 to join plates 64 and 66 together, much in the manner described in connection with FIGURE 1. As illustrated in FIGURE 6 the nut 62 may have a cross section generally the same as the cross section of the shank 54 so that the shank and nut may be moved one within the other without an interlock. Naturally, the shank should be slightly smaller in cross sectional area than the smooth interior opening in the nut 62.

In operation, once the nut and shank have been moved to the desired position either the shank or the nut is turned so that the thread-like configuration on the shank will form mating threads on the interior smooth surface of the nut. No axial movement is necessary. The material of the shank will cold form or swage the material of the nut such that some material from the nut will flow in toward the root of the thread-like configuration of the shank, this material being that displaced by the crest of the thread-like configuration on the shank. Preferably the maximum amount of rotation necessary to complete the interlock of the shank and nut is that which will place the radial areas 58 on the shank opposite the relieved areas 68 on the nut. In other words, there is relative movement between the shank and the nut until the maximum amount of radial pressure is applied by the thread-like configuration on the shank to the nut. As shown in FIGURE 6 this will be one eighth of a turn, although the number of degrees of turn necessary to complete the interlock will depend on the number of relieved and radial areas. By utilizing the relative relationship between the pitch radius and the outside radius of the relieved areas 60 it is possible to have an interlock with a minimum amount of applied torque, but yet a positive interlock.

The use, operation and function of the invention are as follows:

The present practice in using cap screws, bolts or the like to join members together is to tap a hole in the member to receive the screw or to use a tapped nut with the bolt. Present practice also requires extensive turning to either insert the screw or to back it out. By forming a thread-like surface on the bolt or cap screw into a generally lobular formation and by forming the hole in the nut or the member to receive the cap screw in the same cross sectional shape, it is possible to eliminate conventional tapping procedure and extensive turning of the screw or nut.

The internal surface on the nut, for example, is smooth and will easily receive a cap screw when the surfaces are properly aligned. Relative rotation between the two surfaces will cause the radial or locking areas on the shank to move into the material forming the nut and to swage or displace this material in and around the threads until the internal surface of the nut has defined threaded sections. The threads will apply both axial and radial pressure to the nut. The material forming the nut preferably is somewhat softer than the material forming the bolt and brass or other ductile metals are satisfactory. Some plastics may also be used. Relative movement between the nut and the shank is limited to a certain fraction of thread pitch in order to provide for full locking between the threads on the shank and the nut. A positive stop for the axial and rotary movement between these two members may be provided by compressible material properly placed between the nut and the head on the bolt. In addition, a stop of a suitable type may be placed within the hole itself to prevent rotation of the threaded member beyond a certain point. In the form shown in FIGURES 5 and 6 the cap screw may have a suitable mark on the head to indicate an appropriate amount of rotation.

Although the invention has been described as using an external thread-like configuration on the shank of the cap screw or bolt, it should be realized that in the alternative, the nut may be internally threaded and the shank may be smooth. Also, it is not necessary to place the compressible material adjacent the head of the bolt or cap screw, as it may be positioned on the external surface of the nut.

The type of compressible material and its formation may vary widely. Spring washers are satisfactory as are compressible rings formed of rubber or nylon. Projections formed of similar material are also satisfactory. These projections may be inside of or outside of the ring 24, as shown in FIGURE 1, and in some applications a hole may be formed in the head of the screw or bolt to receive the compressible material as the two members are locked together.

An additional advantage in using a compressible material to provide a positive stop on the relative movement between the threaded member and the smooth member is that the compressible member places tension on the threads and thus provides a further locking effect.

If it is later desired to remove the screw, it merely is backed off a fraction of a turn until the screw and hole lobes or high points are aligned. The screw may then be pulled out. The same hole and screw can, of course, be reused.

The invention has been described in connection with a cap screw or bolt with a continuous thread. Flutes or grooves may be formed in the threaded section and it will still function perfectly satisfactorily. The invention should not be limited to any particular thread-like formation. Also, the nose or front of the threaded section may be beveled or tapered.

It is not necessary that the threaded member perform a swaging action on the smooth member. In some applications the threaded member may cut threads in the smooth member. The material forming the two members may determine whether the threads will cut the material or displace it.

Whereas the preferred form of the invention has been shown and described herein, it should be realized that there are many modifications, substitutions and alterations thereto within the scope of the following claims.

I claim:

1. In a means for interlocking two members, a first member having a generally cylindrical surface with a helical thread-like configuration, said first member having a lobular cross section with each 360 degrees of said thread-like configuration including a plurality of spaced radial reliefs with an outstanding radial locking area between each radial relief, the maximum outside radius of said radial reliefs being less than the pitch radius of said locking areas, a second member having a smooth generally cylindrical surface and a lobular cross section generally the same as said first member, each 360 degrees of said second member including a plurality of spaced radial reliefs with an oustanding radial locking area between each radial relief, said first and second members having relative cross sectional dimensions such that they may be placed one inside the other, without interlocking contact, only when the radial reliefs of the first member are generally in alignment with the radial reliefs of the second member, relative rotary movement of said members being effective to cause the outstanding locking areas of said first member to interlock with the second member, and a curved compressible annulus positioned in contact with a radially extending bearing surface of one of said members and extending toward the other member, said annulus having a concave, convex curvature with an effective compressible length which limits axial movement between the members and limits relative rotation of said members to that fraction of a full revolution found by dividing one by two times the number of radial locking areas in 360 degrees of said thread-like configuration.

2. In a means for interlocking two members, a first member having a generally cylindrical surface with a helical thread-like configuration, said first member having a lobular cross section with each 360 degrees of said thread-like configuration including a plurality of spaced radial reliefs with an outstanding radial locking area between each radial relief, the maximum outside radius of said radial reliefs being less than the pitch radius of said locking areas, a second member having a smooth generally cylindrical surface and a lobular cross section generally the same as said first member, each 360 degrees of said second member including a plurality of spaced radial reliefs with an outstanding radial locking area between each radial relief, said first and second members having relative cross sectional dimensions such that they may be placed one inside the other, without interlocking contact, only when the radial reliefs of the first member are generally in alignment with the radial reliefs of the second member, relative rotary movement of said members being effective to cause the outstanding locking areas of said first member to interlock with the second member, and limiting means including at least one compressible projection in contact with a radially extending bearing surface of one of said members and extending toward the other member, said projection having an effective compressible length which limits axial movement between said members and limits relative rotation of said members to that fraction of a full revolution found by dividing one by two times the number of radial locking areas in 360 degrees of said thread-like configuration.

References Cited by the Examiner

UNITED STATES PATENTS

| 252,868 | 1/1882 | Denison | 285—178 |
|---|---|---|---|
| 954,304 | 4/1910 | Kenney. | |
| 1,451,970 | 4/1923 | Taylor. | |
| 1,872,048 | 8/1932 | Thomas | 285—178 |
| 2,352,982 | 7/1944 | Tomalis | 85—47 |
| 2,574,134 | 11/1951 | Vigren et al. | 85—36 |
| 2,781,687 | 2/1957 | Knocke | 85—62 |
| 2,943,528 | 7/1960 | Curry | 85—62 |
| 3,006,003 | 10/1961 | Johnson. | |
| 3,139,786 | 7/1964 | Ardell | 85—7 |

FOREIGN PATENTS 641,767  5/1962  Canada.

CARL W. TOMLIN, *Primary Examiner.*

M. HENSON WOOD, Jr., EDWARD C. ALLEN,
*Examiners.*